United States Patent
Zhu (10) Patent No.: US 11,611,982 B2
(45) Date of Patent: Mar. 21, 2023

(54) MULTI-SUBFRAME SCHEDULING METHOD, DEVICE AND TERMINAL

(71) Applicant: YULONG COMPUTER TELECOMMUNICATION SCIENTIFIC (SHENZHEN) CO., LTD., Shenzhen (CN)

(72) Inventor: Ya-Jun Zhu, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 1209 days.

(21) Appl. No.: 16/090,218

(22) PCT Filed: Oct. 31, 2016

(86) PCT No.: PCT/CN2016/104031
§ 371 (c)(1),
(2) Date: Sep. 29, 2018

(87) PCT Pub. No.: WO2017/166810
PCT Pub. Date: Oct. 5, 2017

(65) Prior Publication Data
US 2021/0227567 A1    Jul. 22, 2021

(30) Foreign Application Priority Data

Mar. 31, 2016 (CN) .................. 201610206236.X (51) Int. Cl.
*H04W 72/12* (2009.01)
*H04W 72/0446* (2023.01)

(52) U.S. Cl.
CPC ... *H04W 72/1289* (2013.01); *H04W 72/0446* (2013.01)

(58) Field of Classification Search
CPC ... H04L 1/1864; H04L 1/1822; H04L 5/0094; H04L 1/0038; H04W 72/12;
(Continued)

(56) References Cited

U.S. PATENT DOCUMENTS

| 9,877,341 B2 | 1/2018 | Lin et al. |
| 2014/0254509 A1* | 9/2014 | Chen ............ H04W 72/12 370/329 |

(Continued)

FOREIGN PATENT DOCUMENTS

| CN | 102325377 A | 1/2012 |
| CN | 103796327 A | 5/2014 |

(Continued)

OTHER PUBLICATIONS

Alcatel-Lucent Shanghai Bell et al: "Consideration for Multi-SF and Cross-SF Scheduling in LTE-A",3GPP Draft; R1-132057 Consideration for Multi-SF and Cross-SF Scheduling in LTE-A_Final, 3rd Generation Partnership Project (3GPP), Mobile Competence Centre; 650, Route Des Lucioles ; F-06921 Sophia-Antipolis, vol. RAN WG1, no. Fukuoka, Japan; May 20, 2013-May 24, 2013 May 11, 2013 (May 11, 2013), XP050697839.

(Continued)

*Primary Examiner* — Vinncelas Louis
(74) *Attorney, Agent, or Firm* — ScienBiziP, P.C.

(57) ABSTRACT

A multi-subframe scheduling method, a device and a terminal are disclosed. The multi-subframe scheduling method includes: receiving configuration information sent by a base station for instructing a terminal to perform multi-subframe scheduling; detecting whether a multi-subframe scheduling instruction sent by the base station is received; when the multi-subframe scheduling signaling is received, sending or receiving data on a plurality of corresponding subframes according to the multi-subframe scheduling signaling and (Continued)

the configuration information. By the technical solution of the present disclosure, data transmission on a plurality of subframes can be scheduled on one subframe, and the multi-subframe scheduling mechanism can be reasonably applied.

15 Claims, 5 Drawing Sheets

(58) Field of Classification Search
CPC ......... H04W 72/1289; H04W 72/0446; H04W 72/042; H04W 72/1221; H04W 72/0413
See application file for complete search history.

(56) References Cited

U.S. PATENT DOCUMENTS

| | | |
|---|---|---|
| 2015/0264708 A1 | 9/2015 | Li et al. |
| 2016/0014727 A1* | 1/2016 | Nimbalker ............ H04L 1/0038 370/329 |
| 2016/0065332 A1 | 3/2016 | Yum et al. |
| 2016/0095093 A1 | 3/2016 | Yi et al. |
| 2016/0142898 A1* | 5/2016 | Poitau ............... H04W 72/0413 370/329 |
| 2016/0255650 A1* | 9/2016 | Xia ...................... H04L 1/1822 370/329 |
| 2018/0367282 A1* | 12/2018 | Li ........................ H04L 5/0094 |

FOREIGN PATENT DOCUMENTS

| | | | |
|---|---|---|---|
| CN | 105592558 A | 5/2016 | |
| CN | 105722239 A | 6/2016 | |
| CN | 105722240 A | 6/2016 | |
| CN | 105764146 A | 7/2016 | |
| EP | 2914043 A2 * | 9/2015 | ........... H04L 1/1864 |

OTHER PUBLICATIONS

QUALCOMM: "Way Forward on Scheduling in UL subframes",3GPP Draft; R1-161380, 3rd Generation Partnership Project (3GPP), Mobile Competence Centre; 650, Route Des Lucioles ; F-06921 Sophia-Antipolis Cedex ; France, vol. RAN WG1, no. St Julian's, Malta; Feb. 15, 2016-Feb. 19, 2016 Feb. 24, 2016 (Feb. 24, 2016), XP051079302.

Ericsson: "Work Item on Enhanced LAA for LTE",3GPP Draft; RP-160585, 3rd Generation Partnership Project (3GPP), Mobile Competence Centre; 650, Route Des Lucioles ; F-06921 Sophia-Antipolis Cedex ; France, vol. TSG RAN, no. Gothenburg, Sweden; Mar. 7, 2016-Mar. 109, 2016 Mar. 2016 (Mar. 9, 2016), XP051658418.

LG Electronics: "Support of multi/cross-subframe scheduling insmall cell scenarios",3GPP Draft; R1-132235, 3rd Generation Partnership Project (3GPP), Mobile Competence Centre; 650, Route Des Lucioles ; F-06921 Sophia-Antipolis Cedex France, vol. RAN WG1, no. Fukuoka, Japan; May 20, 2013-May 24, 2013 May 11, 2013 (May 11, 2013), XP050698007.

* cited by examiner

MULTI-SUBFRAME SCHEDULING METHOD, DEVICE AND TERMINAL

CROSS-REFERENCE TO RELATED APPLICATIONS

This application claims priority of Chinese Patent Application No. 201610206236.X, entitled "multi-subframe scheduling method, device and terminal," filed on Mar. 31, 2016 in the China National Intellectual Property Administration (CNIPA), the entire contents of which are incorporated by reference herein.

FIELD

The embodiments of the present disclosure relates to a technical field of communication, specifically a multi-subframe scheduling method, a multi-subframe scheduling device and a terminal.

BACKGROUND

At present, with a rapid development of mobile services, existing capacity of wireless frequency spectrums allocated to the mobile services cannot meet requirements. In the 3GPP Rel-13 stage, a mechanism that is referred to as License-Assisted Access (LAA) is introduced. In a LAA mechanism, a transmission of mobile communication can be carried on unlicensed frequency spectrums, such as a 5 Ghz frequency band, and currently the unlicensed frequency spectrums are mainly used by Wi-Fi, BLUETOOTH®, radar, medical system, etc.

As diversity and complexity of a system on an unlicensed frequency spectrum, safety of users and stability of a connection cannot be ensured if a Long Term Evolution (LTE) mechanism is directly used on the unlicensed frequency spectrums. Therefore, in the LAA mechanism, licensed frequency spectrums are used to assist in accessing the unlicensed frequency spectrums through a Carrier Aggregation (CA) mechanism. At present, if the LTE is used on the unlicensed frequency spectrums, the system can have the following two working modes: one is Supplemental Downlink (SDL), that is, there are merely downlink transmission subframes; and the other is a Time Division Duplex (TDD) mode, which not only includes downlink subframes, but also includes uplink subframes.

In a LAA system, in order to ensure fair share of unlicensed frequency spectrum with other systems, a listening before talk (LBB) mechanism is introduced. That is, before sending data, a sending end needs to detect whether a channel is idle, and the data can be sent only when the channel is idle. Data transmission of a base station or a terminal can be discontinuous due to usage of the LBT mechanism.

In a design of the LAA, considering a limitation of the maximum transmission time after the channel is occupied, transmission overhead of control instruction needs to be reduced as small as possible; in addition, the transmission of uplink data is limited by the maximum transmission time and traditional scheduling limit, it may result in a problem that an uplink scheduling instruction cannot be found. At present, a concept of multi-subframe scheduling or cross-subframe scheduling has been proposed, that is, a scheduling instruction can schedule data transmission on multiple subframes, or a scheduling instruction on a certain subframe can schedule data transmission on other subframes. However, how to schedule data transmission on a plurality of subframes through a scheduling instruction on a subframe has not been determined.

SUMMARY

In view of the above, according to a first aspect of the present disclosure, a multi-subframe scheduling method is provided and includes: receiving configuration information sent by a base station for instructing a terminal to perform multi-subframe scheduling; detecting whether a multi-subframe scheduling instruction sent by the base station is received; when the multi-subframe scheduling instruction is received, sending or receiving data on a plurality of corresponding subframes according to the multi-subframe scheduling instruction and the configuration information.

In the technical solution, by receiving the configuration information sent by the base station for instructing the terminal to perform multi-subframe scheduling, the terminal can know the relevant configuration information during multi-subframe scheduling, such as a scheduled subframe position etc. When receiving the multi-subframe scheduling instruction sent by the base station, the terminal further can send or receive data on the plurality of corresponding subframes (namely a plurality of subframes that are scheduled by the multi-subframe scheduling instruction) based on the configuration information and the multi-subframe scheduling instruction sent by the base station previously. Thus, a purpose of scheduling data transmission on a plurality of subframes through one subframe is achieved, and reasonable use of the multi-subframe scheduling mechanism can be ensured.

In the technical solution, optionally, the step of detecting whether the multi-subframe scheduling instruction sent by the base station is received specifically includes: detecting a specified information domain in downlink control information (DCI) sent by the base station, to determine whether the multi-subframe scheduling instruction is received based on identification of the specified information domain.

In the technical solution, when the base station sends the multi-subframe scheduling instruction to the terminal, the base station can multiplex one or some information domains in existing downlink control information to realize, and then the terminal can determine whether the multi-subframe scheduling instruction is received by detecting the specified information domain (namely an information domain based on multiplexing) in the downlink control information sent by the base station.

In any of the technical solutions as mentioned above, optionally, the step of detecting whether the multi-subframe scheduling instruction sent by the base station is received specifically includes: detecting whether downlink control information sent by the base station and dedicated to multi-subframe scheduling is received; when the downlink control information dedicated to multi-subframe scheduling and sent by the base station is received, determining that the multi-subframe scheduling instruction is received.

In the technical solution, the base station can define a new DCI format to be dedicated to performing the multi-subframe scheduling, and then the terminal can determine whether the multi-subframe scheduling instruction is received by detecting whether the downlink control information dedicated to multi-subframe scheduling and sent by the base station is received.

In any of the technical solutions as mentioned above, optionally, the step of detecting whether the multi-subframe scheduling instruction sent by the base station is received specifically includes: when receiving any scheduling instruction sent by the base station, determining whether a specified scrambling sequence is scrambled on the any scheduling instruction; and when it is determined that the specified scrambling sequence is scrambled on the any scheduling instruction, determining that the received any scheduling instruction is the multi-subframe scheduling instruction.

In the technical solution, a scrambling sequence can be defined, and the base station scrambles the original scheduling instruction through the scrambling sequence to represent a multi-subframe scheduling instruction, and then the terminal can determine whether the multi-subframe scheduling instruction is received by determining whether the scheduling instruction is scrambled through the defined scrambling sequence.

In the technical solution as mentioned above, optionally, before the step of determining whether the specified scrambling sequence is scrambled on the any scheduling instruction, the method further includes: acquiring the specified scrambling sequence that is predefined; or receiving the specified scrambling sequence notified by the base station on a licensed frequency band or an unlicensed frequency band through Radio Resource Control signaling, media access control (MAC) control element (CE) signaling or physical layer signaling.

In the technical solution, the scrambling sequence can be predefined and stored in the terminal, and also can be notified to the terminal by the base station.

In any of the technical solutions as mentioned above, optionally, the step of detecting whether the multi-subframe scheduling instruction sent by the base station is received specifically includes: acquiring a predefined Radio Network Temporary Identity (RNTI) used for detecting the multi-subframe scheduling instruction, or receiving RNTI used for detecting the multi-subframe scheduling instruction, notified by the base station on the licensed frequency band or the unlicensed frequency band through the Radio Resource Control signaling, the MAC CE signaling or the physical layer signaling; when the scheduling instruction sent by the base station is detected through the wireless network temporary identifier, determining that the scheduling instruction sent by the base station is the multi-subframe scheduling instruction.

In the technical solution, when the base station notifies the terminal of a RNTI, the base station can notify the terminal of one RNTI used for multi-subframe scheduling, and then the terminal can detect based on the RNTI to determine whether the scheduling instruction sent by the base station is the multi-subframe scheduling instruction. Different terminals can have the same or different RNTIs for multi-subframe scheduling.

In any of the technical solutions as mentioned above, optionally, detecting whether a multi-subframe scheduling instruction sent by the base station is received, on a position of a subframe notified by the base station and/or on positions of all downlink subframes where the scheduling instruction needs to be detected.

In the technical solution, when detecting whether a multi-subframe scheduling instruction sent by the base station is received, the terminal can detect on the position of the subframe notified by the base station, and also on the positions of all the downlink subframes where the scheduling instruction needs to be detected.

In any of the technical solutions as mentioned above, optionally, the configuration information includes a combination of any one or more of the following: a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

In any of the technical solutions as mentioned above, optionally, the step of receiving the configuration information sent by the base station for instructing the terminal to perform multi-subframe scheduling specifically includes: receiving the configuration information sent by the base station on a licensed frequency band or an unlicensed frequency band through Radio Resource Control signaling, MAC CE signaling or physical layer signaling.

According to the second aspect of the present disclosure, a multi-subframe scheduling device is provided and includes: a first receiving unit configured to receive configuration information sent by a base station for instructing a terminal to perform multi-subframe scheduling; a detection unit configured to detect whether a multi-subframe scheduling instruction sent by the base station is received; a processing unit configured to, when a detection result of the detection unit represents that the multi-subframe scheduling instruction is received, send or receive data on a plurality of corresponding subframes according to the multi-subframe scheduling instruction and the configuration information.

In the technical solution, by receiving the configuration information sent by the base station for instructing the terminal to perform multi-subframe scheduling, the terminal can know the relevant configuration information during multi-subframe scheduling, such as a scheduled subframe position etc. When receiving the multi-subframe scheduling instruction sent by the base station, the terminal further can send or receive data on the plurality of corresponding subframes (namely a plurality of subframes that are scheduled by the multi-subframe scheduling instruction) based on the configuration information and the multi-subframe scheduling instruction sent by the base station previously. Thus, a purpose of scheduling data transmission on a plurality of subframes through one subframe is achieved, and reasonable use of the multi-subframe scheduling mechanism can be ensured.

In the technical solution as mentioned above, optionally, the detection unit is specifically configured to detect a specified information domain in downlink control information (DCI) sent by the base station, to determine whether the multi-subframe scheduling instruction is received based on identification of the specified information domain.

In the technical solution, when the base station sends the multi-subframe scheduling instruction to the terminal, the base station can multiplex one or some information domains in existing downlink control information to realize, and then the terminal can determine whether the multi-subframe scheduling instruction is received by detecting the specified information domain (namely an information domain based on multiplexing) in the downlink control information sent by the base station.

In any of the technical solutions as mentioned above, optionally, the detection unit is specifically configured to detect whether downlink control information sent by the base station and dedicated to multi-subframe scheduling is received, and determine that the multi-subframe scheduling instruction is received when the downlink control information dedicated to multi-subframe scheduling and sent by the base station is received.

In the technical solution, the base station can define a new DCI format to be dedicated to performing the multi-subframe scheduling, and then the terminal can determine whether the multi-subframe scheduling instruction is received by detecting whether the downlink control information dedicated to multi-subframe scheduling and sent by the base station is received.

In any of the technical solutions as mentioned above, optionally, the detection unit includes: a judgment unit configured to determine whether a specified scrambling sequence is scrambled on any scheduling instruction when receiving the any scheduling instruction sent by the base station; and a first determination unit configured to determine that the received any scheduling instruction is the multi-subframe scheduling instruction when the judgment unit determines that the specified scrambling sequence is scrambled on the any scheduling instruction.

In the technical solution, a scrambling sequence can be defined, and the base station scrambles the original scheduling instruction through the scrambling sequence to represent a multi-subframe scheduling instruction, and then the terminal can determine whether the multi-subframe scheduling instruction is received by determining whether the scheduling instruction is scrambled through the defined scrambling sequence.

In the technical solution as mentioned above, optionally, the device further includes: a first acquisition unit configured to acquire the specified scrambling sequence that is predefined; or a second receiving unit configured to receive the specified scrambling sequence notified by the base station on a licensed frequency band or an unlicensed frequency band through Radio Resource Control signaling, MAC CE signaling or physical layer signaling.

In the technical solution, the scrambling sequence can be predefined and stored in the terminal, and also can be notified to the terminal by the base station.

In any of the technical solutions as mentioned above, optionally, the detection unit includes: a second acquisition unit configured to acquire a predefined RNTI used for detecting the multi-subframe scheduling instruction, or a third receiving unit configured to receive RNTI used for detecting the multi-subframe scheduling instruction, notified by the base station on the licensed frequency band or the unlicensed frequency band through the Radio Resource Control signaling, the MAC CE signaling or the physical layer signaling. The detection unit further includes a second determination unit, which is configured to determine that the scheduling instruction sent by the base station is the multi-subframe scheduling instruction, when the scheduling instruction sent by the base station is detected through the wireless network temporary identifier.

In the technical solution, when the base station notifies the terminal of a RNTI, the base station can notify the terminal of one RNTI used for multi-subframe scheduling, and then the terminal can detect based on the RNTI to determine whether the scheduling instruction sent by the base station is the multi-subframe scheduling instruction. Different terminals can have the same or different RNTIs for multi-subframe scheduling.

In any of the technical solutions as mentioned above, optionally, the detection unit is specifically configured to detect whether a multi-subframe scheduling instruction sent by the base station is received, on a position of a subframe notified by the base station and/or on positions of all downlink subframes where the scheduling instruction needs to be detected.

In the technical solution, when detecting whether a multi-subframe scheduling instruction sent by the base station is received, the terminal can detect on the position of the subframe notified by the base station, and also on the positions of all the downlink subframes where the scheduling instruction needs to be detected.

In any of the technical solutions as mentioned above, optionally, the configuration information includes a combination of any one or more of the following: a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

In any of the technical solutions as mentioned above, optionally, the first receiving unit is specifically configured to receive the configuration information sent by the base station on a licensed frequency band or an unlicensed frequency band through Radio Resource Control signaling, MAC CE signaling or physical layer signaling.

According to the third aspect of the present disclosure, a terminal is provided and includes any multi-subframe scheduling device as mentioned in the above technical solutions.

DETAILED DESCRIPTION

In order to more clearly understand the above objectives, features and advantages of the present disclosure, the present disclosure will be further described in detail in the following with reference to the accompanying drawings and embodiments. It should be noted that, embodiments of the present disclosure and features of the embodiments can be combined with each other, when there is no conflict.

Various details are described in the following descriptions for better understanding of the present disclosure, however, the present disclosure may also be implemented in other ways other than those described herein, accordingly, the scope of the present disclosure is not limited by the specific embodiments disclosed below.

Figure 1:
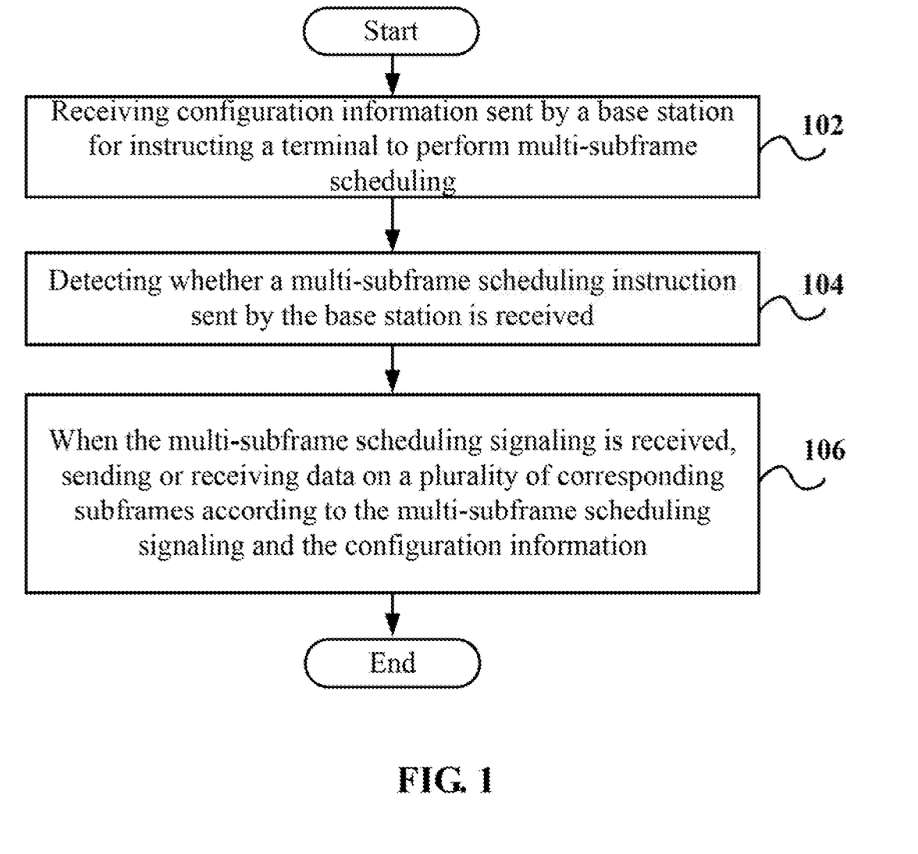
FIG. 1 shows a schematic flowchart of a multi-subframe scheduling method according to an embodiment of the present disclosure.

FIG. 1 shows a schematic flowchart of a multi-subframe scheduling method according to an embodiment of the present disclosure.

As shown in FIG. 1, a multi-subframe scheduling method according to an embodiment of the present disclosure includes:

Step 102: receiving configuration information sent by a base station for instructing a terminal to perform multi-subframe scheduling;

Step 104: detecting whether a multi-subframe scheduling instruction sent by the base station is received;

Step 106: when the multi-subframe scheduling instruction is received, sending or receiving data on a plurality of corresponding subframes according to the multi-subframe scheduling instruction and the configuration information.

In the technical solution, by receiving the configuration information sent by the base station for instructing the terminal to perform multi-subframe scheduling, the terminal can know the relevant configuration information during multi-subframe scheduling, such as a scheduled subframe position etc. When receiving the multi-subframe scheduling instruction sent by the base station, the terminal further can send or receive data on the plurality of corresponding subframes (namely a plurality of subframes that are scheduled by the multi-subframe scheduling instruction) based on the configuration information and the multi-subframe scheduling instruction sent by the base station previously. Thus, a purpose of scheduling data transmission on a plurality of subframes through one subframe is achieved, and reasonable use of the multi-subframe scheduling mechanism can be ensured. As an embodiment of the present disclosure, a plurality of subframes scheduled by a multi-subframe scheduling instruction can be determined based on a position of a subframe scheduled by the multi-subframe scheduling instruction included in configuration information sent by a base station, or a scheduling rule for determining a position of the scheduled subframe, and a subframe position for receiving the multi-subframe scheduling instruction.

A method for detecting whether the multi-subframe scheduling instruction sent by the base station is received, can be implemented as following embodiments:

A First Embodiment

Detecting a specified information domain in downlink control information (DCI) sent by the base station, to determine whether the multi-subframe scheduling instruction is received based on identification of the specified information domain.

In the technical solution, when the base station sends the multi-subframe scheduling instruction to the terminal, the base station can multiplex one or some information domains in existing downlink control information to realize, and then the terminal can determine whether the multi-subframe scheduling instruction is received by detecting the specified information domain (namely an information domain based on multiplexing) in the downlink control information sent by the base station.

A Second Embodiment

Detecting whether downlink control information sent by the base station and dedicated to multi-subframe scheduling is received; when the downlink control information dedicated to multi-subframe scheduling and sent by the base station is received, determining that the multi-subframe scheduling instruction is received.

In the technical solution, the base station can define a new DCI format to be dedicated to performing the multi-subframe scheduling, and then the terminal can determine whether the multi-subframe scheduling instruction is received by detecting whether the downlink control information dedicated to multi-subframe scheduling and sent by the base station is received.

A Third Embodiment

When receiving any scheduling instruction sent by the base station, determining whether a specified scrambling sequence is scrambled on the any scheduling instruction; and when it is determined that the specified scrambling sequence is scrambled on the any scheduling instruction, determining that the received any scheduling instruction is the multi-subframe scheduling instruction.

In the technical solution, a scrambling sequence can be defined, and the base station scrambles the original scheduling instruction through the scrambling sequence to represent a multi-subframe scheduling instruction, and then the terminal can determine whether the multi-subframe scheduling instruction is received by determining whether the scheduling instruction is scrambled through the defined scrambling sequence.

In the technical solution as mentioned above, optionally, before the step of determining whether the specified scrambling sequence is scrambled on the any scheduling instruction, the method further includes: acquiring the specified scrambling sequence that is predefined; or receiving the specified scrambling sequence notified by the base station on a licensed frequency band or an unlicensed frequency band through Radio Resource Control signaling, media access control (MAC) control element (CE) signaling or physical layer signaling.

In the technical solution, the scrambling sequence can be predefined and stored in the terminal, and also can be notified to the terminal by the base station.

A Fourth Embodiment

Acquiring a predefined Radio Network Temporary Identity (RNTI) used for detecting the multi-subframe scheduling instruction, or receiving RNTI used for detecting the multi-subframe scheduling instruction, notified by the base station on the licensed frequency band or the unlicensed frequency band through the Radio Resource Control signaling, the MAC CE signaling or the physical layer signaling; when the scheduling instruction sent by the base station is detected through the wireless network temporary identifier, determining that the scheduling instruction sent by the base station is the multi-subframe scheduling instruction.

In the technical solution, when the base station notifies the terminal of a RNTI, the base station can notify the terminal of one RNTI used for multi-subframe scheduling, and then the terminal can detect based on the RNTI to determine whether the scheduling instruction sent by the base station is the multi-subframe scheduling instruction. Different terminals can have the same or different RNTIs for multi-subframe scheduling.

As mentioned above, it is provided four methods for detecting whether a multi-subframe scheduling instruction sent by the base station is received, in a practical use procedure, one of the four methods can be used for detection, and a plurality of combinations can be used for detection. In addition, the terminal can detect whether a multi-subframe scheduling instruction sent by the base station is received, on a position of a subframe notified by the base station and/or on positions of all downlink subframes where the scheduling instruction needs to be detected.

In any of the technical solutions as mentioned above, optionally, the configuration information includes a combination of any one or more of the following: a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

In any of the technical solutions as mentioned above, optionally, the step of receiving the configuration information sent by the base station for instructing the terminal to perform multi-subframe scheduling specifically includes: receiving the configuration information sent by the base station on a licensed frequency band or an unlicensed frequency band through Radio Resource Control signaling, MAC CE signaling or physical layer signaling.

Figure 2:
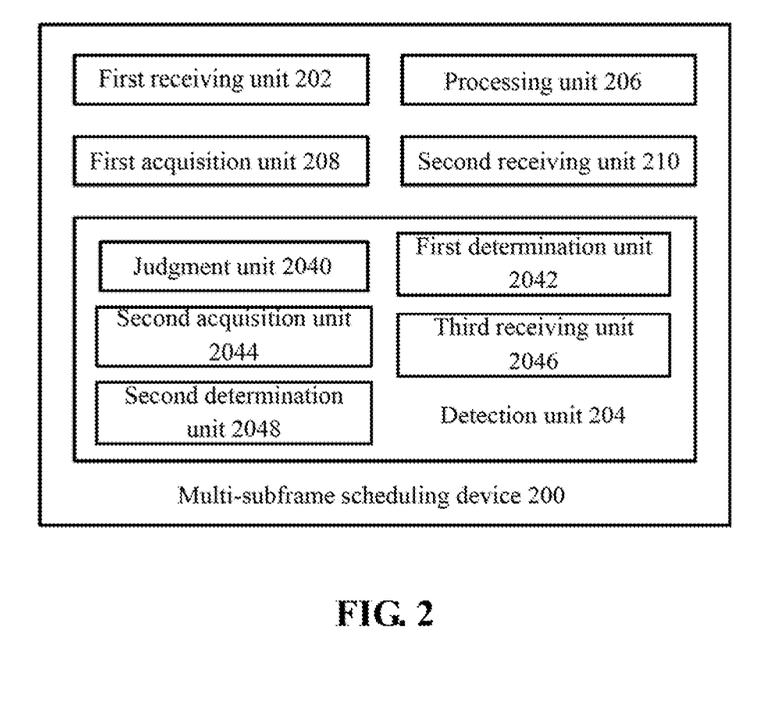
FIG. 2 shows a schematic block diagram of a multi-subframe scheduling device according to an embodiment of the present disclosure.

FIG. 2 shows a schematic block diagram of a multi-subframe scheduling device according to an embodiment of the present disclosure.

As shown in FIG. 2, a multi-subframe scheduling device 200 according to an embodiment of the present disclosure includes: a first receiving unit 202, a detection unit 204, and a processing unit 206.

The first receiving unit 202 is configured to receive configuration information sent by a base station for instructing a terminal to perform multi-subframe scheduling; the detection unit 204 is configured to detect whether a multi-subframe scheduling instruction sent by the base station is received; the processing unit 206 is configured to, when a detection result of the detection unit 204 represents that the multi-subframe scheduling instruction is received, send or receive data on a plurality of corresponding subframes according to the multi-subframe scheduling instruction and the configuration information.

In the technical solution, by receiving the configuration information sent by the base station for instructing the terminal to perform multi-subframe scheduling, the terminal can know the relevant configuration information during multi-subframe scheduling, such as a scheduled subframe position etc. When receiving the multi-subframe scheduling instruction sent by the base station, the terminal further can send or receive data on the plurality of corresponding subframes (namely a plurality of subframes that are scheduled by the multi-subframe scheduling instruction) based on the configuration information and the multi-subframe scheduling instruction sent by the base station previously. Thus, a purpose of scheduling data transmission on a plurality of subframes through one subframe is achieved, and reasonable use of the multi-subframe scheduling mechanism can be ensured.

A method that the detection unit 204 detect whether the multi-subframe scheduling instruction sent by the base station is received can be implemented as following embodiments:

A First Embodiment

The detection unit 204 is specifically configured to detect a specified information domain in downlink control information (DCI) sent by the base station, to determine whether the multi-subframe scheduling instruction is received based on identification of the specified information domain.

In the technical solution, when the base station sends the multi-subframe scheduling instruction to the terminal, the base station can multiplex one or some information domains in existing downlink control information to realize, and then the terminal can determine whether the multi-subframe scheduling instruction is received by detecting the specified information domain (namely an information domain based on multiplexing) in the downlink control information sent by the base station.

A Second Embodiment

The detection unit 204 is specifically configured to detect whether downlink control information sent by the base station and dedicated to multi-subframe scheduling is received, and determine that the multi-subframe scheduling instruction is received when the downlink control information dedicated to multi-subframe scheduling and sent by the base station is received.

In the technical solution, the base station can define a new DCI format to be dedicated to performing the multi-subframe scheduling, and then the terminal can determine whether the multi-subframe scheduling instruction is received by detecting whether the downlink control information dedicated to multi-subframe scheduling and sent by the base station is received.

A Third Embodiment

The detection unit 204 includes: a judgment unit 2040 configured to determine whether a specified scrambling sequence is scrambled on any scheduling instruction when receiving the any scheduling instruction sent by the base station; and a first determination unit 2042 configured to determine that the received any scheduling instruction is the multi-subframe scheduling instruction when the judgment unit 2040 determines that the specified scrambling sequence is scrambled on the any scheduling instruction.

In the technical solution, a scrambling sequence can be defined, and the base station scrambles the original scheduling instruction through the scrambling sequence to represent a multi-subframe scheduling instruction, and then the terminal can determine whether the multi-subframe scheduling instruction is received by determining whether the scheduling instruction is scrambled through the defined scrambling sequence.

The technical solution as mentioned above, optionally, further includes: a first acquisition unit 208 configured to acquire the specified scrambling sequence that is predefined; or a second receiving unit 210 configured to receive the specified scrambling sequence notified by the base station on a licensed frequency band or an unlicensed frequency band through Radio Resource Control signaling, MAC CE signaling or physical layer signaling.

In the technical solution, the scrambling sequence can be predefined and stored in the terminal, and also can be notified to the terminal by the base station.

A Fourth Embodiment

The detection unit 204 includes: a second acquisition unit 2044 configured to acquire a predefined RNTI used for detecting the multi-subframe scheduling instruction, or a third receiving unit 2046 configured to receive RNTI used for detecting the multi-subframe scheduling instruction, notified by the base station on the licensed frequency band or the unlicensed frequency band through the Radio Resource Control signaling, the MAC CE signaling or the physical layer signaling. The detection unit 204 further includes a second determination unit 2048, which is configured to determine that the scheduling instruction sent by the base station is the multi-subframe scheduling instruction, when the scheduling instruction sent by the base station is detected through the wireless network temporary identifier.

In the technical solution, when the base station notifies the terminal of a RNTI, the base station can notify the terminal of one RNTI used for multi-subframe scheduling, and then the terminal can detect based on the RNTI to determine whether the scheduling instruction sent by the base station is the multi-subframe scheduling instruction. Different terminals can have the same or different RNTIs for multi-subframe scheduling.

As mentioned above, it is provided four solutions for the detection unit 204 to detect whether a multi-subframe scheduling instruction sent by the base station is received, in a practical use procedure, one of the four solutions can be used for detection, and a plurality of combinations can be used for detection.

In any of the technical solutions as mentioned above, optionally, the detection unit 204 is specifically configured to detect whether a multi-subframe scheduling instruction sent by the base station is received, on a position of a subframe notified by the base station and/or on positions of all downlink subframes where the scheduling instruction needs to be detected.

In the technical solution, when detecting whether a multi-subframe scheduling instruction sent by the base station is received, the terminal can detect on the position of the subframe notified by the base station, and also on the positions of all the downlink subframes where the scheduling instruction needs to be detected.

In any of the technical solutions as mentioned above, optionally, the configuration information includes a combination of any one or more of the following: a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

In any of the technical solutions as mentioned above, optionally, the first receiving unit 202 is specifically configured to receive the configuration information sent by the base station on a licensed frequency band or an unlicensed frequency band through Radio Resource Control signaling, MAC CE signaling or physical layer signaling.

Figure 3:
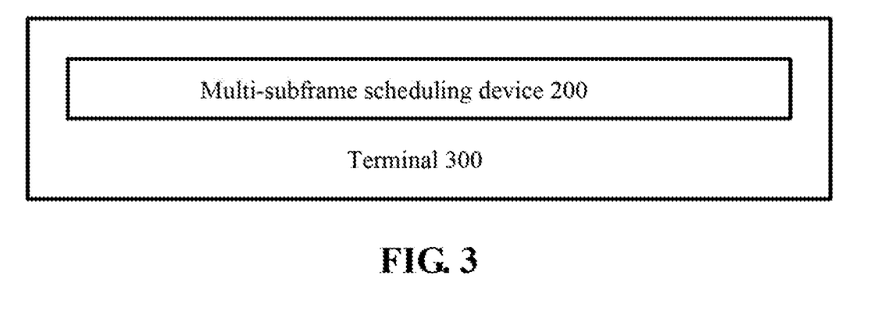
FIG. 3 shows a schematic block diagram of a terminal according to an embodiment of the present disclosure.

FIG. 3 shows a schematic block diagram of a terminal according to an embodiment of the present disclosure.

As shown in FIG. 3, a terminal 300 according to an embodiment of the present disclosure includes the multi-subframe scheduling device 200 as shown in FIG. 2.

In conclusion, the present disclosure mainly provides a design solution for multi-subframe scheduling instruction applied to unlicensed frequency bands, to make a single scheduling instruction on one subframe be able to schedule data transmission on a plurality of subframes.

A detailed process, mainly including three steps, is provided as follows:

Step 1:
A base station sends configuration information on a licensed frequency band or an unlicensed frequency band through Radio Resource Control (RRC) signaling, media access control (MAC) control element (CE) or physical layer signaling, to instruct a terminal to perform multi-subframe scheduling.

The configuration information may include a trigging signaling of multi-subframe scheduling, a position of a subframe scheduled by the multi-subframe scheduling instruction, a determination rule of the position of the subframe scheduled by the multi-subframe scheduling instruction, modulation and coding strategies (MCS) used on different subframes, resource allocation information, sending power adjustment information of the terminal, and a subframe position where the multi-subframe scheduling signaling is located. It should be noted that a configuration instruction for sending the configuration information can be one piece to include all of the configuration information needed to be sent; and can also be a plurality of pieces to include different configuration information respectively.

Step 2:
The terminal receives the scheduling signaling for multi-subframe scheduling on the corresponding subframe position. The terminal can acquire the subframe position where the multi-subframe scheduling signaling is located through the configuration information issued by the base station, and can also detect the multi-subframe scheduling signaling on all downlink subframes that need to perform scheduling signaling detections.

Regarding identification of scheduling signaling for multi-subframe scheduling, there are following methods:

Method 1: identifying through information domain in multiplex scheduling instruction. Specifically, the multi-subframe scheduling is realized by multiplexing some information fields of current DCI.

Method 2: defining a new scheduling instruction. Specifically, a new DCI format is defined for being dedicated to multi-subframe scheduling. After detecting the new scheduling instruction, the terminal can know that the new scheduling instruction applies to multi-subframe scheduling.

Method 3: identifying through a scrambling sequence.

Specifically, a scheduling instruction is identified to be a multi-subframe scheduling instruction by performing a method of scrambling an original scheduling instruction. In this method, a scrambling sequence needs to be defined, and if a certain predefined scrambling sequence is scrambled on the scheduling signaling, the terminal knows that the scheduling signaling is used for multi-subframe scheduling after the terminal detects the scrambling sequence; and if the scheduling signaling is not scrambled with a certain predefined scrambling sequence, the terminal considers that the scheduling instruction is only for scheduling data transmission on one subframe. The scrambling sequence needs to be pre-defined, or is sent by a base station to notify the terminal through RRC signaling, MAC CE or physical layer signaling.

Figure 4:
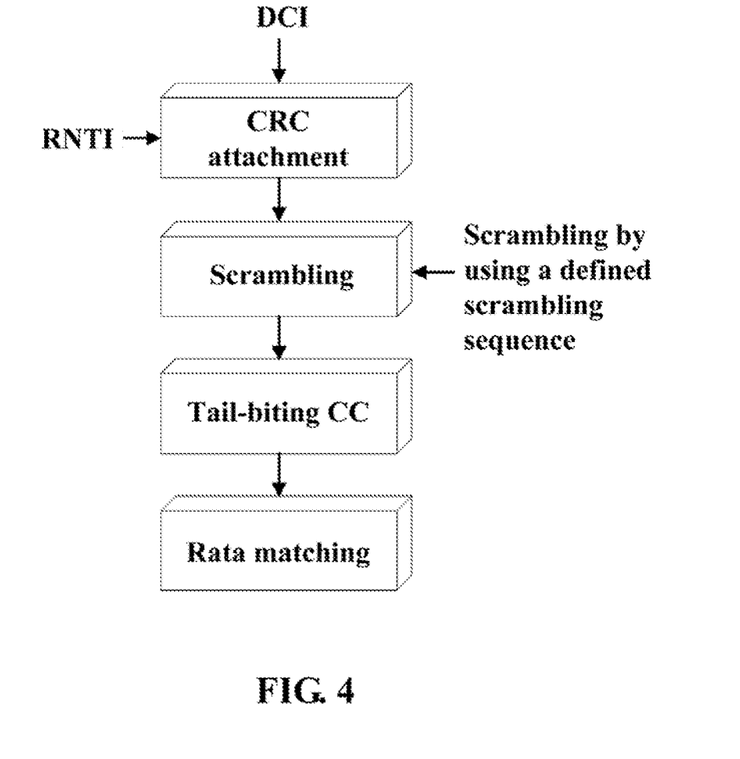
FIG. 4 shows a schematic flowchart of scrambling a scheduling instruction through a new scrambling sequence according to an embodiment of the present disclosure.

A specific processing flow of the solution is shown in FIG. 4: firstly, a Cyclic Redundancy Code (CRC) attachment process is executed, namely a Cyclic Redundancy Code is added into DCI signaling and scrambling is carried out through the RNTI meanwhile; secondly, carrying out scrambling by using a defined scrambling sequence; then a convolution coding and rate matching process is performed sequentially.

Method 4: identifying by defining a new RNTI.

Specifically, a new RNTI set can be defined, and when the base station notifies the terminal of value of the RNTI, two RNTIs can be notified, one is used for a traditional single frame scheduling, and one is used for multi-subframe scheduling. When the terminal detects each scheduling instruction, the base station needs to notify the terminal to use two RNTIs to detect, so as to know whether the scheduling instruction is used for indicating the multi-subframe scheduling.

In addition, a new RNTI can be pre-defined in the terminal without notification from the base station, and when the terminal detects each scheduling instruction, if a scheduling instruction is detected through the new RNTI, the scheduling instruction is determined to be a multi-subframe scheduling instruction.

Step 3:

The terminal sends or receives data on corresponding subframes (namely a plurality of subframes scheduled by the multi-subframe scheduling instruction).

The above embodiments of the present disclosure provide a design solution for applying a scheduling instruction on an unlicensed frequency band, based on the above technical solution, data sending or receiving on a plurality of subframes can be scheduled through one scheduling instruction.

Figure 5:
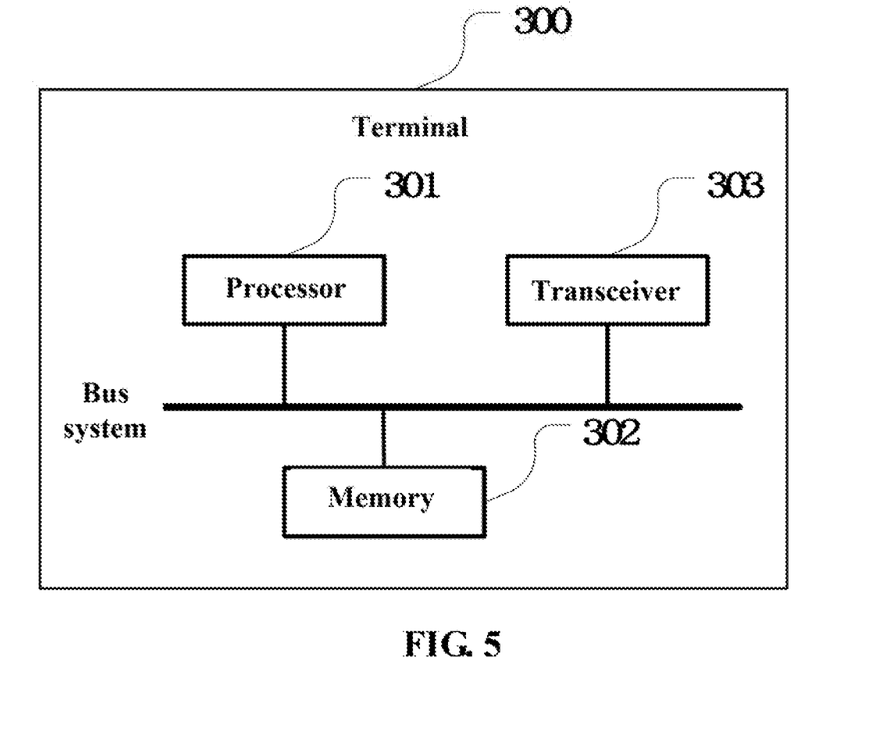
FIG. 5 shows a structural diagram of another terminal according to an embodiment of the present disclosure.

FIG. 5 shows a structural diagram of another terminal according to an embodiment of the present disclosure. A terminal 300 in the embodiments of the present disclosure can be different types of electronic devices, such as a smart phone, a tablet computer, a handheld computer, a mobile Internet device, a personal digital assistant, a media player, a smart television, a smart watch, smart glasses, a smart bracelet, etc. As shown in FIG. 5, the terminal 300 in the embodiment of the present disclosure includes: at least one processor 301, such as a central processing unit (CPU), at least one transceiver 303, and at least one memory 302. A connection communication among these components of the processor 301, the memory 302 and the transceiver 303 is realized through a bus system. The transceiver 303 may be a wired transmission port, and can also be wireless equipment, such as an antenna device for carrying out a data communication with other equipment. The memory 302 may be a high-speed random access memory (RAM) or a non-volatile memory, such as at least one magnetic disk storage The memory 302 stores program codes, and the processor 301 can invoke the program codes stored in the memory 302, to execute related functions. For example, the various units as mentioned in FIG. 2 (e.g., the first receiving unit 202, the detection unit 204, the processing unit 206, the first acquisition unit 208, the second receiving unit 210, etc.) are program codes stored in the memory 302, and can be executed by the processor 301, so as to realize function of each unit to realize the multi-subframe scheduling method.

Specifically, the processor 301 receives configuration information sent by a base station for instructing a terminal to perform multi-subframe scheduling; detects whether a multi-subframe scheduling instruction sent by the base station is received; when the multi-subframe scheduling instruction is received, sends or receives data on a plurality of corresponding subframes according to the multi-subframe scheduling instruction and the configuration information.

In a further embodiment, the processor 301: detects a specified information domain in downlink control information (DCI) sent by the base station, to determine whether the multi-subframe scheduling instruction is received based on identification of the specified information domain.

Optionally, in a further embodiment, the processor 301: detects whether downlink control information sent by the base station and dedicated to multi-subframe scheduling is received; when the downlink control information dedicated to multi-subframe scheduling and sent by the base station is received, determines that the multi-subframe scheduling instruction is received.

Optionally, in a further embodiment, the processor 301: when receiving any scheduling instruction sent by the base station, determines whether a specified scrambling sequence is scrambled on the any scheduling instruction; and when it is determined that the specified scrambling sequence is scrambled on the any scheduling instruction, determines that the received any scheduling instruction is the multi-subframe scheduling instruction.

In a further embodiment, the processor 301: acquires the specified scrambling sequence that is predefined; or Receives the specified scrambling sequence notified by the base station on a licensed frequency band or an unlicensed frequency band through Radio Resource Control signaling, MAC CE signaling or physical layer signaling.

Optionally, in a further embodiment, the processor 301: acquires a predefined RNTI used for detecting the multi-subframe scheduling instruction, or receives RNTI used for detecting the multi-subframe scheduling instruction, notified by the base station on the licensed frequency band or the unlicensed frequency band through the Radio Resource Control signaling, the MAC CE signaling or the physical layer signaling; when the scheduling instruction sent by the base station is detected through the wireless network temporary identifier, determines that the scheduling instruction sent by the base station is the multi-subframe scheduling instruction.

In a further embodiment, the processor 301: detects whether a multi-subframe scheduling instruction sent by the base station is received, on a position of a subframe notified by the base station and/or on positions of all downlink subframes where the scheduling instruction needs to be detected.

In a further embodiment, the configuration information includes a combination of any one or more of the following:

a triggering signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

In a further embodiment, in a step of receiving the configuration information sent by the base station for instructing the terminal to perform multi-subframe scheduling specifically includes: the processor 301 receives the configuration information sent by the base station on a licensed frequency band or an unlicensed frequency band through Radio Resource Control signaling, MAC CE signaling or physical layer signaling.

With reference to the accompanying drawings, the technical solution of the present disclosure is described in detail above. The present disclosure provides a novel multi-subframe scheduling solution, data transmission on a plurality of subframes can be scheduled on one subframe, and the multi-subframe scheduling mechanism can be reasonably applied.

The above mentioned descriptions are merely preferred embodiments of the present disclosure, and are not to limit the present disclosure. For persons skilled in the art, various changes or modifications may be made to the present disclosure. Any modification, equivalent, and improvement without departing from the spirit and scope of the present disclosure, should be within the protection scope of the present disclosure.

I claim:

1. A multi-subframe scheduling method, comprising:
   receiving configuration information sent by a base station for instructing a terminal to perform multi-subframe scheduling;
   detecting whether a multi-subframe scheduling instruction sent by the base station is received;
   when the multi-subframe scheduling instruction is received, sending or receiving data on a plurality of corresponding subframes according to the multi-subframe scheduling instruction and the configuration information;
   characterized in that:
   detecting whether the multi-subframe scheduling instruction sent by the base station is received comprises:
   when receiving any scheduling instruction sent by the base station, determining whether a specified scrambling sequence is scrambled on the any scheduling instruction, wherein the specified scrambling sequence is scrambled on the any scheduling instruction by:
      executing a Cyclic Redundancy Code, CRC, attachment process, wherein the CRC is scrambled by a radio network temporary identifier, RNTI;
      carrying out scrambling on the any scheduling instruction by using the specified scrambling sequence;
      performing a convolution coding process; and
      performing a rate matching process; and
   when it is determined that the specified scrambling sequence is scrambled on the any scheduling instruction, determining that the received any scheduling instruction is the multi-subframe scheduling instruction.

2. The multi-subframe scheduling method of claim 1, before determining whether the specified scrambling sequence is scrambled on the any scheduling instruction, further comprising:
   acquiring the specified scrambling sequence that is predefined; or
   receiving the specified scrambling sequence notified by the base station on a licensed frequency band or an unlicensed frequency band through Radio Resource Control (RRC) signaling, media access control (MAC) control element (CE) signaling or physical layer signaling.

3. The multi-subframe scheduling method of claim 1, wherein:
   detecting whether a multi-subframe scheduling instruction sent by the base station is received, on a position of a subframe notified by the base station and/or on positions of all downlink subframes where the scheduling instruction needs to be detected.

4. The multi-subframe scheduling method of claim 1, wherein the configuration information comprises a combination of any one or more of:
   a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

5. The multi-subframe scheduling method of claim 1, wherein receiving the configuration information sent by the base station for instructing the terminal to perform multi-subframe scheduling comprises:
   receiving the configuration information sent by the base station on a licensed frequency band or an unlicensed frequency band through RRC signaling, MAC CE signaling or physical layer signaling.

6. A terminal, comprising:
   a processor; and
   a memory storing a plurality of instructions, which when executed by the processor, causes the processor to:
   receiving configuration information sent by a base station for instructing a terminal to perform multi-subframe scheduling;
   detecting whether a multi-subframe scheduling instruction sent by the base station is received;
   when the multi-subframe scheduling instruction is received, sending or receiving data on a plurality of corresponding subframes according to the multi-subframe scheduling instruction and the configuration information;
   characterized in that:
   detecting whether the multi-subframe scheduling instruction sent by the base station is received comprises:
   when receiving any scheduling instruction sent by the base station, determining whether a specified scrambling sequence is scrambled on the any scheduling instruction, wherein the specified scrambling sequence is scrambled on the any scheduling instruction by:
      executing a Cyclic Redundancy Code, CRC, attachment process, wherein the CRC is scrambled by a radio network temporary identifier, RNTI;
      carrying out scrambling on the any scheduling instruction by using the specified scrambling sequence;
      performing a convolution coding process; and
      performing a rate matching process; and
   when it is determined that the specified scrambling sequence is scrambled on the any scheduling instruction, determining that the received any scheduling instruction is the multi-subframe scheduling instruction.

7. The terminal of claim 6, wherein the processor further:
   acquires the specified scrambling sequence that is predefined; or
   receives the specified scrambling sequence notified by the base station on a licensed frequency band or an unlicensed frequency band through Radio Resource Control (RRC) signaling, media access control (MAC) control element (CE) or physical layer signaling.

8. The terminal of claim 6, wherein the processor further:
   detects whether a multi-subframe scheduling instruction sent by the base station is received, on a position of a subframe notified by the base station and/or on positions of all downlink subframes where the scheduling instruction needs to be detected.

9. The terminal of claim 6, wherein the configuration information comprises a combination of any one or more of:
   a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

10. The terminal of claim 6, wherein the processor further:
receives the configuration information sent by the base station on a licensed frequency band or an unlicensed frequency band through RRC signaling, MAC CE signaling or physical layer signaling.

11. A non-transitory storage medium having stored thereon instructions that, when executed by a processor of a terminal, causes the processor of the terminal to perform a multi-subframe scheduling method, the multi-subframe scheduling method comprising:
receiving configuration information sent by a base station for instructing a terminal to perform multi-subframe scheduling;
detecting whether a multi-subframe scheduling instruction sent by the base station is received;
when the multi-subframe scheduling instruction is received, sending or receiving data on a plurality of corresponding subframes according to the multi-subframe scheduling instruction and the configuration information;
characterized in that:
detecting whether the multi-subframe scheduling instruction sent by the base station is received comprises:
when receiving any scheduling instruction sent by the base station, determining whether a specified scrambling sequence is scrambled on the any scheduling instruction, wherein the specified scrambling sequence is scrambled on the any scheduling instruction by:
executing a Cyclic Redundancy Code, CRC, attachment process, wherein the CRC is scrambled by a radio network temporary identifier, RNTI;
carrying out scrambling on the any scheduling instruction by using the specified scrambling sequence;
performing a convolution coding process; and
performing a rate matching process; and
when it is determined that the specified scrambling sequence is scrambled on the any scheduling instruction, determining that the received any scheduling instruction is the multi-subframe scheduling instruction.

12. The non-transitory storage medium according to claim 11, wherein the multi-subframe scheduling method further comprises:
acquiring the specified scrambling sequence that is pre-defined; or
receiving the specified scrambling sequence notified by the base station on a licensed frequency band or an unlicensed frequency band through Radio Resource Control (RRC) signaling, media access control (MAC) control element (CE) signaling or physical layer signaling.

13. The non-transitory storage medium according to claim 11, wherein the multi-subframe scheduling method further comprises:
detecting whether a multi-subframe scheduling instruction sent by the base station is received, on a position of a subframe notified by the base station and/or on positions of all downlink subframes where the scheduling instruction needs to be detected.

14. The non-transitory storage medium according to claim 11, wherein the configuration information comprises a combination of any one or more of:
a trigging signaling of multi-subframe scheduling, a position of a subframe scheduled by the multi-subframe scheduling instruction, a determination rule of the position of the subframe scheduled by the multi-subframe scheduling instruction, modulation and coding strategies used on different subframes, resource allocation information, sending power adjustment information of the terminal, and a subframe position where sending the multi-subframe scheduling instruction.

15. The non-transitory storage medium according to claim 11, wherein the multi-subframe scheduling method further comprises:
receiving the configuration information sent by the base station on a licensed frequency band or an unlicensed frequency band through RRC signaling, MAC CE signaling or physical layer signaling.

\* \* \* \* \*